United States Patent [19]

Lucas, Jr. et al.

[11] Patent Number: 5,318,214
[45] Date of Patent: Jun. 7, 1994

[54] ACTIVATED BRAZING SYSTEM FOR JOINING TITANIUM ALUMINIDE

[75] Inventors: Matthew J. Lucas, Jr., Fairfield; Murray S. Smith, Jr., Greenhills, both of Ohio

[73] Assignee: The United States of America as represented by the Secretary of the Air Force, Washington, D.C.

[21] Appl. No.: 122,723

[22] Filed: Nov. 18, 1987

[51] Int. Cl.$^5$ .............................................. B23K 31/02
[52] U.S. Cl. ........................................ 228/121; 419/5; 419/8; 419/9; 428/548; 428/553; 428/554
[58] Field of Search .................................. 228/121, 122

[56] References Cited

U.S. PATENT DOCUMENTS

| | | | |
|---|---|---|---|
| 2,822,269 | 2/1958 | Long | 75/175.5 |
| 2,847,302 | 8/1958 | Long | 75/134 |
| 2,906,008 | 9/1959 | Boegehold et al. | 29/194 |
| 4,034,454 | 7/1977 | Galasso et al. | 428/576 |
| 4,034,906 | 7/1977 | Carlson et al. | 228/194 |
| 4,393,987 | 7/1983 | Anderson et al. | 228/157 |
| 4,580,714 | 4/1986 | Mayer et al. | 228/121 |
| 4,738,389 | 4/1988 | Moshier et al. | 228/198 |
| 4,750,889 | 6/1988 | Ignasiak | 228/180.1 |
| 4,762,268 | 8/1988 | Doble | 228/186 |

*Primary Examiner*—Donald P. Walsh
*Assistant Examiner*—John N. Greaves
*Attorney, Agent, or Firm*—Bobby Scearce; Donald J. Singer

[57] ABSTRACT

A method for brazing together two parts at least one of which comprises a titanium aluminide material is described wherein a metallic layer of foil or powder is inserted between the parts in laminar contact with respective confronting surfaces thereof to be joined, the metallic layer comprising a metal which forms with titanium a eutectic composition having a characteristic fusion temperature lower than the fusion temperature of the metal, and the metallic layer and confronting surfaces of the parts are heated to a temperature of about the characteristic fusion temperature of the eutectic composition.

5 Claims, 1 Drawing Sheet

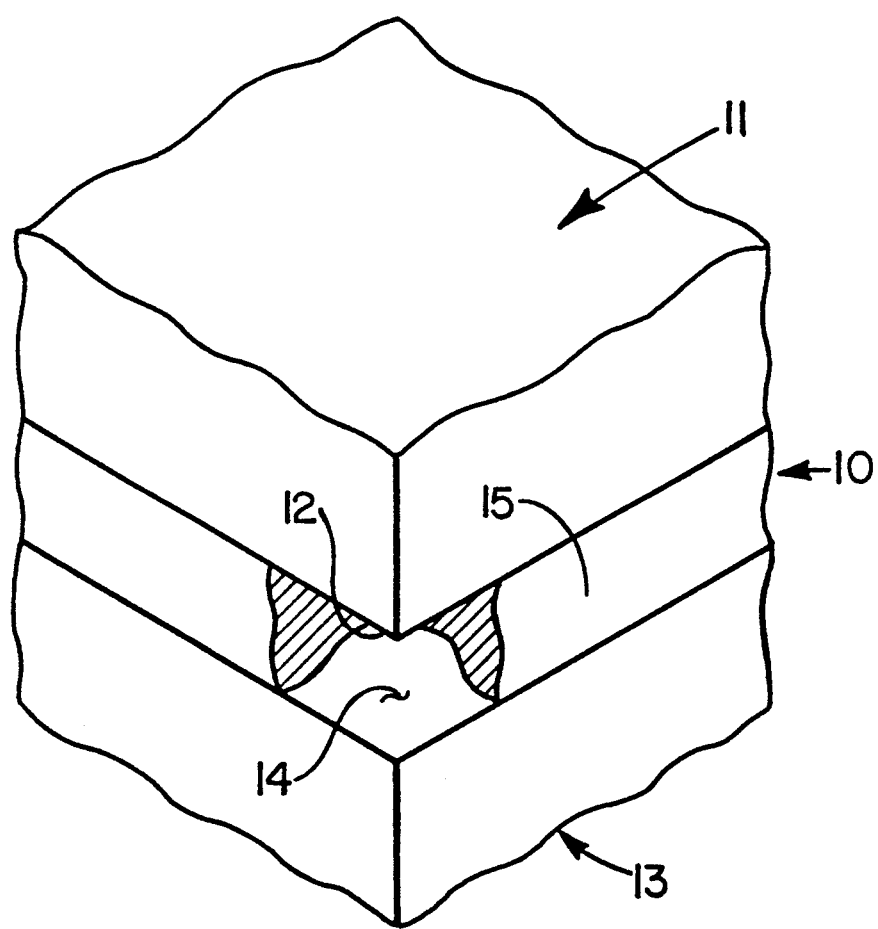

ACTIVATED BRAZING SYSTEM FOR JOINING TITANIUM ALUMINIDE

RIGHTS OF THE GOVERNMENT

The invention described herein may be manufactured and used by or for the Government of the United States for all governmental purposes without the payment of any royalty.

BACKGROUND OF THE INVENTION

The present invention relates generally to methods and systems for brazing materials, and more particularly to an improved brazing system for titanium aluminide.

Titanium aluminide is an intermetallic compound of relatively recent development having good high temperature (to about 2000° F.) properties and is a candidate for high temperature applications such as in turbine rotors and blades and other jet engine parts. Because of its high strength to weight ratio, titanium aluminide in either of its phases (alpha $Ti_3Al$ or gamma $TiAl$) or in alloy system(s) with other metal(s) may be used to fabricate parts having substantially lighter weight than parts fabricated from nickel base superalloys. Although titanium aluminide is brittle at room temperature and is considered generally hard to fabricate, recent advances in powder metallurgy and rapid solidification technology have allowed expanded use of titanium aluminide materials in the fabrication of quality parts. Most applications of titanium aluminide material, however, require that it be welded, brazed or otherwise joined to a similar material or to other high temperature materials such as Hastelloy X sheet or honeycomb, Inconel-718, titanium alloys, or Incology-907. Existing brazing methods and materials have proved unsatisfactory in many respects for providing reliable joints for titanium aluminide materials and therefore a need exists for a reliable method for brazing this material.

The invention describes a method for brazing titanium aluminide using a filler material which does not melt at a desired brazing temperature when not in contact with the titanium aluminide base material but when placed in contact with the titanium aluminide material activates the surface thereof to form with titanium a eutectic composition which melts at the desired brazing temperature.

It is therefore an object of the invention to provide a brazing system for titanium aluminide.

It is a further object of the invention to provide a method for brazing titanium aluminide.

These and other objects of the invention will become apparent as the detailed description of representative embodiments proceeds.

SUMMARY OF THE INVENTION

In accordance with the foregoing principles and objects of the invention, a method for brazing together two parts at least one of which comprises a titanium aluminide material is described wherein a metallic layer of foil or powder is inserted between the parts in laminar contact with respective confronting surfaces thereof to be joined, the metallic layer comprising a metal which forms with titanium a eutectic composition having a characteristic fusion temperature lower than the fusion temperature of the metal, and the metallic layer and confronting surfaces of the parts are heated to a temperature of about the characteristic fusion temperature of the eutectic composition.

DESCRIPTION OF THE DRAWINGS

The invention will be clearly understood from the following detailed description of representative embodiments thereof read in conjunction with the accompanying drawing illustrating a brazed joint made according to the teachings of the invention.

DETAILED DESCRIPTION

Referring now to the drawing, illustrated therein is a brazed joint 10 between two parts 11, 13 at least one (e.g., 11) of which comprises titanium aluminide material. Parts 11, 13 have respective confronting surfaces 12, 14 to be joined utilizing braze filler material 15. In joining parts 11, 13 using a brazing material, brazing temperatures of about 1200°-1850° F. for alpha $Ti_3Al$ and about 1800°-2550° F. for gamma $TiAl$ are normally used and, accordingly, a braze filler material 15 having a fusion temperature in that range is ordinarily required. In accordance with the teachings of this invention, a sound brazed joint may be made using a metallic braze filler material 15 having a temperature of fusion higher than the corresponding brazing temperature. A layer of filler material 15 is applied to or placed in contact with surface 12 of the titanium aluminide material of part 11 to be joined. Filler material 15 does not melt at the corresponding brazing temperature when not in contact with titanium aluminide material of part 11, but when inserted between surfaces 12,14 to be joined and heated under light pressure to the desired brazing temperature, filler material 15 activates surface 12 of the titanium aluminide material of part 11 to form a eutectic composition with titanium which melts at a brazing temperature lower than the fusion temperature of filler material 15. The fused eutectic material provides a sound brazed joint 10. In making a brazed joint according to the invention, filler material 15 may be plated to surface 12, or inserted as free material (e.g. plate, sheet, foil or powder) in laminar contact with surfaces 12,14, or applied conventionally to confronting surface 14 if the material of part 13 is different from the titanium aluminide material of part 11.

In demonstration of the invention, highly successful brazed joints were made between parts 11,13 of $Ti_3Al$ and between parts 11,13 respectively of $Ti_3Al$ and Hastelloy X using nickel (mp 2647° F.) plate (about 0.002 inch thick) inserted between parts 11,13. In heating the nickel plate in contact with the titanium aluminide of part 11 to about 1800° F., the nickel activates the contacted surface 12 of part 11 and forms a eutectic composition $Ni_{28}Ti_{72}$ having a melting point of about 1730° F. which is a desirable brazing temperature well below the fusion temperature of nickel. Plate thicknesses in the range of about 0.001 to 0.005 inch are acceptable although not considered limiting of the invention. It is noted that other suitable metal or alloy filler materials 15 which form low temperature (less than about 2250° F.) melting eutectics with titanium may be used as would occur to one skilled in the art guided by these teachings. Examples include cobalt (mp 2723° F.), gold (mp 1948° F.), beryllium (mp 2332° F.), copper (mp 1982° F.), iron (mp 2806° F.), palladium (mp 2830° F.) and chromium (mp 3407° F.), each of which activate a surface of the titanium aluminide material to form with titanium a corresponding eutectic composition having a characteristic fusion temperature lower than the fusion temperature of the parent filler material; alloys of the named metals may also be used. Cobalt forms with titanium a eutectic having composition $Co_{27}Ti_{73}$ (mp about 1860° F.). Gold forms with titanium a eutectic having composition $Au_{16}Ti_{84}$ (mp about 1531° F.); beryllium forms with titanium a eutectic having composition $Be_6Ti_{94}$ (mp about 1890° F.); copper forms with titanium a eutectic having composition $Cu_{78}Ti_{22}$ (mp about 1620° F.); iron forms with titanium a eutectic having composition $Fe_{32}Ti_{68}$ (mp about 1990° F.); palladium forms with titanium a eutectic having composition $Pd_{53}Ti_{47}$ (mp about 2090° F.); and chromium forms with titanium a eutectic having composition $Cr_{47}Ti_{53}$ (mp about 2535° F.).

The invention therefore provides a novel brazing method for titanium aluminide. It is understood that certain modifications to the invention may be made, as might occur to one with skill in the field of the invention, within the scope of the appended claims. All embodiments contemplated hereunder which achieve the objects of the invention have therefore not been shown in complete detail. Other embodiments may be developed without departing from the spirit of the invention or from the scope of the appended claims.

We claim:

1. A method for making a brazed joint between a first part and a second part, at least one of which parts comprises a titanium aluminide material, comprising the steps of:
   (a) inserting a metallic layer between said first and second parts in laminar contact with respective confronting surfaces of said parts to be joined one of which confronting surfaces comprises titanium aluminide, said metallic layer comprising a metallic material which forms with titanium a eutectic composition having a characteristic fusion temperature lower than the fusion temperature of said metallic material; and
   (b) heating said metallic layer and said confronting surfaces of said parts to a temperature of about said characteristic fusion temperature of said eutectic composition.

2. The method of claim 1 wherein said metallic material is a metal selected from the group consisting of nickel, cobalt, gold, beryllium, copper, iron, palladium, and chromium.

3. The method of claim 1 wherein said metallic material is an alloy of a metal selected from the group consisting of nickel, cobalt, gold, beryllium, copper, iron, palladium, and chromium.

4. The method of claim 1 wherein said metallic layer is from about 0.001 to about 0.005 inch in thickness.

5. The method of claim 1 wherein said heating step is performed at temperature less than about 2550° F.

* * * * *